United States Patent [19]

Bujadoux

[11] 4,396,532

[45] Aug. 2, 1983

[54] ACTIVATOR COMPRISING A DIALKYLALUMINUM MONOFLUORIDE FOR THE POLYMERIZATION OF ETHYLENE

[75] Inventor: Karel Bujadoux, Lens, France

[73] Assignee: Societe Chimique des Charbonnages S.A., Paris, France

[21] Appl. No.: 324,957

[22] Filed: Nov. 25, 1981

[51] Int. Cl.$^3$ ............................................. C08F 4/64
[52] U.S. Cl. ............................... 252/429 C; 526/185; 526/151
[58] Field of Search .................................... 252/429 C

[56] References Cited

U.S. PATENT DOCUMENTS

| | | | |
|---|---|---|---|
| 3,047,557 | 7/1962 | Rust et al. | 252/429 C X |
| 3,462,403 | 8/1969 | Pendleton | 252/429 C X |
| 3,502,634 | 3/1970 | Stedefeder | 252/429 C X |
| 3,790,544 | 2/1974 | Maertens et al. | 252/429 C X |
| 4,093,789 | 6/1978 | Kuroda et al. | 252/429 C X |
| 4,113,654 | 9/1978 | Mayr et al. | 252/429 C |
| 4,246,384 | 1/1981 | Selman | 252/429 C X |

FOREIGN PATENT DOCUMENTS

| | | |
|---|---|---|
| 1214965 | 11/1959 | France . |
| 1255970 | 2/1961 | France . |
| 46-34612 | 10/1971 | Japan . |
| 1441115 | 6/1976 | United Kingdom . |

Primary Examiner—Patrick Garvin
Attorney, Agent, or Firm—Finnegan, Henderson, Farabow, Garrett & Dunner

[57] ABSTRACT

A polymerization activator for polymerizing ethylene comprising a dialkylaluminum monofluoride mixed with minor amounts of at least one of dialkylaluminum hydride or halide and a trialkylaluminum. The activator preferably corresponds to the general formula $(AlR_2F)(AlR_2H)_b(AlR_3)_c$ or the general formula $(AlR_2F)(AlR_2X)_a$ wherein R is an alkyl group having 1 to 12 carbon atoms, $0.1 \leq b \leq 0.4$, $0.05 \leq c \leq 0.2$, X is a halogen other than fluorine, and $0.1 \leq a \leq 0.4$. The activator is used in a catalytic system including at least one halide of a transition metal of Group IVB to VIB, the valency of the metal in the halide being not more than 3 and the atomic ratio of aluminum in the activator to transition metal in the catalyst lying between 0.1 and 10. The catalytic system is used in a high pressure and temperature process for polymerizing or copolymerizing ethylene.

3 Claims, No Drawings

ACTIVATOR COMPRISING A DIALKYLALUMINUM MONOFLUORIDE FOR THE POLYMERIZATION OF ETHYLENE

BACKGROUND OF THE INVENTION

The present invention relates to activators provided in catalytic systems suitable for the polymerization of ethylene.

A large number of different Ziegler type catalysts are already known for the polymerization of ethylene and α-olefins. These catalysts generally comprise the catalyst component itself, consisting of at least one halogenated compound of a transition metal of Groups IV to V of the Periodic System, and an activator, selected from hydrides and organometallic compounds of metals of Groups I to III of the Periodic System. The catalyst component comprising the transition metal may be fixed, if so desired, on an inert support such as alumina, silica, magnesium oxide, magnesium halides, etc.

More particularly, the present invention relates to activators provided in Ziegler type catalytic systems, capable of polymerizing ethylene, optionally in the presence of at least one α-olefin, under high pressure and at high temperature. The invention also relates to a process for the polymerization of ethylene under elevated pressure, above 200 bars, and at elevated temperature, above 170° C., in the presence of such catalytic systems.

The polymerization activators most frequently mentioned in the literature are the hydrides of lithium and/or aluminum, trialkylaluminums, alkylsiloxalanes, and alkylaluminum chlorides. The literature gives isolated examples of activators, containing a halogenated aluminum compound, the halogen of the compound being other than chlorine. However, French Patent Specification No. 1,214,965 describes the use for the polymerization of α-olefins, particularly those having from 3 to 10 carbon atoms, at low temperature, below 150° C., and under low pressure, from 1 to 30 atmospheres, of an activator consisting of a mixture of alkyl-metal halide, the halogen being other than fluorine, and of alkyl-metal fluoride, the ratio of halide to fluoride lying between 9 and 1. French Patent Specification No. 1,255,970 describes the polymerization of olefins at low temperature, below 100° C., in the presence of a catalyst, obtained by treating the reaction mixture of TiCl$_4$ and a halogenated organoaluminum compound with a mixture of a trialkylaluminum and a metal fluoride, the ratio of trialkylaluminum:metal fluoride:alkylaluminum dihalide (formed by reduction of TiCl$_4$) lying between 0.1:0.9:1 and 0.9:0.1:1. Finally, Japanese Patent Specification No. 71/34,612 describes the polymerization of propylene at 160° C. and under 35 bars in solution in the presence of a mixture of titanium trichloride and diethylaluminum fluoride in a molecular ratio Al/Ti equal to 2.

On the other hand, it is known to polymerize ethylene under a pressure of between approximately 200 and 2,500 bars, and at a temperature of between approximately 160° and 300° C. Within the scope of such a process, the goal is to improve the quality of the polymer produced by modifying the following parameters in particular: density, molecular weight, and molecular weight distribution.

SUMMARY OF THE INVENTION

The object of the present invention is therefore to provide catalysts that can be used for polymerizing ethylene under conditions of high temperature and high pressure, as defined above, and are capable of improving the quality of the polymer produced.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the polymerization activator of the present invention comprises a dialkylaluminum monofluoride, mixed with minor amounts of at least one of dialkylaluminum hydride or halide (the halogen being other than fluorine) and a trialkylaluminum. As embodied herein, they preferably correspond to the general formula $(AlR_2F)(AlR_2H)_b(AlR_3)_c$ wherein R is an alkyl group having from 1 to 12 carbon atoms, $0.1 \leq b \leq 0.4$, and $0.05 \leq c \leq 0.2$, or to the general formula $(AlR_2F)(AlR_2X)_a$ wherein R is as defined above, X is a halogen other than fluorine, and $0.1 \leq a \leq 0.4$. X may thus be chlorine, bromine, or iodine.

DESCRIPTION OF THE PREFERRED EMBODIMENTS

Reference will now be made in detail to the presently preferred embodiments of the invention.

The polymerization activators within the scope of the present invention can be prepared by two methods. The first method comprises reacting a trialkylaluminum with aluminum trifluoride, the molecular ratio of the first reactant to the second reactant being in the neighborhood of 2, at a temperature on the order of from 120° to 180° C. and then recovering the product formed by filtration or decantation. The product formed corresponds to the formula $$(AlR_2F)(AlR_2H)_b(AlR_3)_c$$

wherein R, b, and c are as defined above. It comprises more or less trialkylaluminum according to the progress of the reaction that is responsible for its formation and more or less dialkylaluminum hydride according to the reaction temperature.

The second method comprises carrying out a halogen exchange reaction between a dialkylaluminum halide—the halogen being other than fluorine—and an alkali metal fluoride. This reaction is carried out in an aliphatic or cycloaliphatic hydrocarbon solvent at a temperature on the order of from 80° to 120° C. and followed by a filtration step for separating the alkali metal halide, formed at the same time as the dialkylaluminum fluoride, which remains in solution in the reaction solvent. The product formed corresponds to the formula $$(AlR_2F)(AlR_2X)_a$$

wherein R, X and a are as defined above. It comprises more or less dialkylaluminum halide according to the progress of the reaction that is responsible for its formation.

The behavior of the activators according to the invention with respect to the polymerization of ethylene under conditions of elevated pressure and elevated temperature is remarkable in that, when used in combination with a given catalyst, they enable the average molecular weight of the polymer formed to be considerably increased in relation to a dialkylaluminum halide or a trialkylaluminum, without impairing the other performance properties, particularly the catalytic polymer yield.

The present invention also relates to a catalytic system, comprising, on the one hand, at least one activator described hereinabove and, on the other hand, at least one catalyst comprising at least one halide of a transition metal of Groups IVB to VIB of the Periodic System, the valency of such metal in the halide not being above 3 and the atomic ratio of aluminum in the activator to transition metal in the catalyst lying between 0.1 and 10. Moreover, the catalyst may optionally comprise an aluminum trihalide, a halide of a metal of Group VIII of the Periodic System and an inert support, such as alumina, silica, magnesium oxide, or the halides of magnesium or manganese. By way of example, titanium trichloride (optionally crystallized together with aluminum trichloride in the form of $TiCl_3 \cdot 1/3 AlCl_3$), vanadium trichloride, or their mixtures can be used as catalysts.

Finally, the present invention relates to a process for the polymerization of ethylene, under a pressure of between 200 and 2,500 bars and at a temperature of between 160° and 300° C., in the presence of a catalytic system such as described hereinabove, the mean residence time of the catalytic system in the polymerization reactor lying between 2 and 100 seconds. This residence time depends on the temperature in the reactor, in the sense that it is the higher, the lower the temperature. This process may need, especially when the polymerization temperature and/or pressure are not very high, the presence of an inert hydrocarbon, having up to 5 carbon atoms, such as, for example, propane, butane, or pentane.

If an autoclave reactor or tubular reactor, having several reaction zones, is used in the process according to the invention, it can be advantageous, with a view to producing certain polymer grades, to adopt a particular arrangement for the polymerization unit, such as, for example, one of those described in French Patent Specifications Nos. 2,346,374 and 2,385,745. For controlling the melt index of the polymer, especially of polyethylene, it is frequently useful to carry out the polymerization in the presence of a chain transfer agent, such as hydrogen. In the high pressure process, this agent may be used at the rate of from 0.04 to 2% by volume, related to ethylene.

The process according to the invention, insofar as it relates to the polymerization or the copolymerization of ethylene, enables a whole range of polymers to be produced, the density of which lies between 0.905 and 0.960 g/cm$^3$ and the melt index of which lies between approximately 0.1 and 100 dg/min. Polymers of relatively low density, for example of between 0.905 and 0.935 g/cm$^3$, are obtained by copolymerizing ethylene with an α-olefin having from 3 to 8 carbon atoms, for example propene, at the rate of from 15 to 35% by weight, or 1-butene, at the rate of from 15 to 60% by weight. Polymers of intermediate density, for example of between 0.935 and 0.945 g/cm$^3$, are obtained by copolymerizing ethylene with an α-olefin having from 3 to 8 carbon atoms, for example propene, at the rate of from 5 to 15% by weight, or 1-butene, at the rate of from 8 to 20% by weight.

The process according to the invention enables the quality of the polymer produced to be improved by modifying the parameters of average molecular weight, density, and molecular weight distribution, without diminishing the catalytic polymer yield more than very slightly. Other advantages of the invention will become clear on reading the following examples, given by way of illustration and without implying any limitation.

EXAMPLE 1

(a) Preparation of the Activator 21 g of aluminum trifluoride, which have been previously milled for a period of 16 hours, are reacted with 57 g of triethylaluminum. The reaction is carried out at a temperature of 130° C. for 6 hours and then at a temperature of 160° C. for 16 hours. The supernatant liquor, recovered by filtration or decantation, is dissolved in a $C_{11}$–$C_{12}$ hydrocarbon cut at a concentration of 0.68 molecule/liter. The exact formula of the liquor is ascertained by determining the residual triethylaluminum groups as well as the diethylaluminum hydride groups by the phenazine method, described by D. E. Jordan, Analytical Chemistry 1968, 40, No. 14, pages 2150–2153. This formula, in which Et denotes the ethyl radical, is the following:

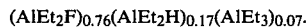

$$(AlEt_2F)_{0.76}(AlEt_2H)_{0.17}(AlEt_3)_{0.07}.$$

(b) Polymerization

Polymerization of ethylene is carried out continuously under a pressure of 600 bars in an autoclave reactor having a volume of 0.6 liter and maintained at a temperature of 230° C. by injecting into the reactor a catalytic system in the dispersed state, in such a way that the mean residence time of the catalytic system in the reactor is equal to approximately 30 seconds. 0.75% by volume of hydrogen is injected into the reactor. The catalytic system used is the compound $TiCl_3 \cdot 1/3 AlCl_3$, activated by the diethylaluminum fluoride liquor, previously prepared and dissolved, the atomic ratio for activation Al/Ti being equal to 6.

Table I below gives the catalytic yield $R_c$, expressed in kilograms of polymer per milli-atom of titanium, the number average molecular weight $M_n$, the percentage B of molecular weights lower than 5,000 (determined by gel permeation chromatography), and the melt index M.I. (measured according to ASTM Standard D-1238 and expressed in dg/min).

EXAMPLES 2 AND 3 (COMPARATIVE)

Ethylene is polymerized under the same operating conditions as those of Example 1, except for the nature of the activator and the quantity of hydrogen injected into the reactor. Here, the activator is either triethylaluminum (Example 2) or diethylaluminum chloride (Example 3). The quantity of hydrogen is 0.5% by volume in both examples. The results are reported in Table I.

EXAMPLE 4

(a) Preparation of the activator 46.5 g of diethylaluminum chloride and 19.5 g of sodium fluoride are reacted together. The reaction is carried out in solution in methyl cyclohexane for 7 hours, 30 minutes at a temperature of 100° C. The liquid phase is separated by filtration and analyzed. The respective concentrations of the two types present, diethylaluminum fluoride (2.50 molecules/liter) and diethylaluminum chloride, make it possible to ascertain the exact formula of the activator:

$(AlEt_2F)_{0.75}(AlEt_2Cl)_{0.25}$.

(b) Polymerization

Ethylene is polymerized under the same operating conditions as those of Example 1, except for the quantity of hydrogen injected into the reactor and the nature of the activator. The quantity of hydrogen is 1% by volume. The activator used is that prepared above. The results are reported in Table I.

EXAMPLES 5 (COMPARATIVE) AND 6

Ethylene is polymerized continuously under a pressure of 1,200 bars in a cylindrical autoclave reactor having a volume of 3 liters and being divided, by means of baffle-plates, into three identical zones, respectively kept at temperatures of 220° C., 250° C., and 240° C. The polymerization is carried out in the presence of 0.75% by volume of hydrogen. The catalyst used is the compound $TiCl_3 \cdot 1/3AlCl_3$, dispersed and activated:

by diethylaluminum chloride for Example 5, by the activator solution obtained in Example 1 (a) with respect to Example 6.

In both cases, the atomic ratio for activation Al/Ti is equal to 3. The results are reported in Table I.

EXAMPLE 7

Ethylene is polymerized under the same operating conditions as those of Examples 5 and 6, except for the quantity of hydrogen and the nature of the catalytic system. 2% of hydrogen by volume is used, the activator is that obtained in Example 4(a), and the catalyst is a compound having the formula $TiCl_3 \cdot 1/3AlCl_3 \cdot VCl_3$.

The results are reported in Table I. The polymer obtained has a density of 0.963 g/cm³.

TABLE I

| Example | $R_c$ | $M_n$ | B % | M.I. |
|---|---|---|---|---|
| 1 | 2.6 | 11,500 | 6.0 | 5.8 |
| 2 | 3.0 | 9,000 | 8.0 | 5.9 |
| 3 | 1.7 | 8,500 | 7.5 | 1.6 |
| 4 | 1.5 | 11,000 | 7.0 | 8.0 |
| 5 | 2.7 | 18,000 | 5.3 | 0.4 |
| 6 | 2.4 | 33,500 | 2.6 | 0.2 |
| 7 | 4.8 | 23,000 | 3.4 | 6.2 |

It will be apparent to those skilled in the art that various modifications and variations could be made in the activator, catalytic system, and process of the invention without departing from the scope or spirit of the invention.

What we claim is:

1. A polymerization activator comprising at least one organoaluminum compound selected from the group consisting of:
   (i) compounds having the formula $(AlR_2F)(AlR_2H)_b(AlR_3)_c$ wherein R is an alkyl group having 1 to 12 carbon atoms, $0.1 \leq b \leq 0.4$, and $0.05 \leq c \leq 0.2$, and
   (ii) compounds having the formula $(AlR_2F)(AlR_2X)_a$ wherein R is an alkyl group having from 1 to 12 carbon atoms, X is a halogen other than fluorine, and $0.1 \leq a \leq 0.4$.

2. A polymerization activator according to claim 1, wherein X is chlorine.

3. A catalytic system for the polymerization of ethylene and the copolymerization of ethylene with an α-olefin having from 3 to 8 carbon atoms, comprising at least one organoaluminum activator compound and at least one halide of a transition metal of Group IV B to VI B of the Periodic System, the valency of said metal in said halide being not more than 3 and the atomic ratio of aluminum in the activator to transition metal in the catalyst lying between 0.1 and 10, wherein said activator is an activator according to claim 1 or 2.

* * * * *

UNITED STATES PATENT AND TRADEMARK OFFICE
CERTIFICATE OF CORRECTION

PATENT NO. : 4,396,532
DATED : August 2, 1983
INVENTOR(S) : Karel Bujadoux

It is certified that error appears in the above-identified patent and that said Letters Patent is hereby corrected as shown below:

Page 1, insert --Foreign Application Priority Data: December 23, 1980, France, 80/27270--

Signed and Sealed this

Seventeenth Day of September 1985

[SEAL]

Attest:

Attesting Officer

DONALD J. QUIGG

Commissioner of Patents and Trademarks—Designate